United States Patent [19]

Roberts

[11] 4,364,830
[45] Dec. 21, 1982

[54] FILTER BOTTOM
[75] Inventor: Robert L. Roberts, Boothwyn, Pa.
[73] Assignee: Roberts Filter Manufacturing Company, Darby, Pa.
[21] Appl. No.: 299,105
[22] Filed: Sep. 3, 1981
[51] Int. Cl.$^3$ .............................................. B01D 23/18
[52] U.S. Cl. ..................................... 210/268; 210/289
[58] Field of Search ............... 210/189, 268, 279, 289, 210/291-293

[56] References Cited

U.S. PATENT DOCUMENTS

| | | | |
|---|---|---|---|
| 139,922 | 6/1873 | Savery | 210/291 |
| 1,411,201 | 3/1922 | Barron | 210/268 |
| 1,455,505 | 5/1923 | Paterson | 210/292 |
| 1,698,079 | 1/1929 | Wagner | 210/293 |
| 1,997,114 | 4/1935 | Martin | 210/717 |
| 2,387,101 | 10/1945 | Walker | 210/293 |
| 2,697,520 | 12/1954 | Ellila | 210/279 |
| 3,391,707 | 7/1968 | Riley et al. | 210/289 |
| 3,552,569 | 1/1971 | Zievers et al. | 210/268 |
| 3,847,805 | 11/1974 | Voedisch | 210/291 |
| 4,161,963 | 7/1979 | Stevens | 210/289 |

Primary Examiner—Ivars C. Cintins
Attorney, Agent, or Firm—Martin L. Faigus

[57] ABSTRACT

A bottom for a filter of the type that employs granular material for removing impurities from liquids includes a trough, the bottom wall of which is interrupted by an egress passage for the granular material. Lateral wall sections of the bottom slope upwardly away from the trough toward sidewalls of the filter. An elongate header, having a central passageway therethrough, is embedded in an elongate sidewall section defining a part of the trough, and a plurality of openings are provided through an outer wall of the header and spaced-apart along the elongate extent thereof for permitting filtered liquid to pass into the header. A plurality of conduits extend laterally from the header and include central passageways communicating with the central passageway of the header. These conduits are spaced-apart along the elongate extent of the header and slope upwardly from the header toward sidewalls of the filter and are embedded in the sloping lateral wall sections of the bottom. The lateral conduits include a plurality of openings through the outer walls thereof, and these openings are spaced along the elongate extent of the conduits for receiving filtered liquid. Liquid-pervious screen devices are associated with the openings through the outer walls of the header and lateral conduits for permitting filtered liquids to enter the header and conduits while impeding the flow of the granular material. The filtered liquid received within the lateral conduits and header pass through an outlet from the filter.

10 Claims, 4 Drawing Figures

FILTER BOTTOM

FIELD OF THE INVENTION

This invention relates to filter bottoms in general, and more specifically to a bottom for a filter of the type that includes granular material employed to remove impurities from liquids, such as water, wastewater and the like.

DESCRIPTION OF THE PRIOR ART

A major concern in the filter art, especially in the art of filtering liquids, such as water, wastewater and the like, is to avoid, or eliminate "dead" areas wherein the liquid to be filtered can stagnate. If the liquid is permitted to collect in stagnant areas in the system, contaminates, such as organics can grow, thereby disrupting effective filtration. The problems associated with stagnant areas in filter systems is well documented in the art, and does not need any extensive elaboration herein.

In filter systems of the type employing granular particulate material, such as granular activated carbon, it is often necessary or desirable to remove the material for replacement and/or regeneration. Therefore, it is highly desirable to provide a filter design which permits easy and reliable removable of the particulate material without damaging any conduits or pipes that may be employed as part of the underdrain system. Although it is also highly desirable to design the filtering system so that the granular material can be removed without the assistance of a worker entering the filter chamber, it is also necessary to design the filter so that a worker can enter the chamber for inspection purposes, without damaging pipes, conduits and other filter components.

A significant problem has existed in the art in forming filter bottoms in a manner which eliminates undesirable "dead spaces"; provides for, and actually assists in the easy removable of particulate material from the filter chamber and protects the conduit system against damage resulting from the mass transfer of particulate material out of the filter, and from the necessity, at times, to have workers enter the filter chamber for inspection and/or similar purposes.

U.S. Pat. No. 2,387,101, issued to Walker, relates to a trickling filter in which the bottom thereof includes a plurality of transverse channels 14 sloping toward a main channel 13. Drain members are employed in connection with the channels to aid in distributing liquid flow through the filter system. There is absolutely no suggestion that the arrangement in Walker will facilitate the removal of particulate material from the filter, while at the same time eliminating "dead spaces" in which liquids can stagnate.

U.S. Pat. No. 4,161,963, issued to Stevens, relates to an ion exchange liquid treatment apparatus of the type having a gradually curved, or sloping bottom wall 13. Stevens employs an open network of conduits forming a lower distributor system closely adjacent the bottom of the treatment tank. This will minimize the volume of exchange resin below the distributor that will not be fully contacted either by the liquid to be treated, or by the regeneration and rinse fluids. In other words, the Stevens' design is directed toward maximizing the use of the ion exchange resins by providing the distribution system close to the bottom wall. In Stevens the supporting rack 51 and the various conduits forming the distributor system are all exposed, and therefore subject to potential contamination during the filtering operation. Although distributor systems generally are formed from noncorrosive materials, such as stainless steel, some corrosion and/or contamination can still take place. Moreover, these noncorrosive materials are quite expensive, and therefore their required use unnecessarily increases the overall cost of the filter system. A further deficiency resides in the fact that the conduits can easily become damaged by the mass transfer of granular material over them when it is necessary to remove the granular material from the system. In addition, when a worker needs to enter the filter, he can potentially damage or break the exposed conduits.

The following additional patents have been considered in connection with this invention, but are not believed to be any more relevant than the Walker and Stevens patents discussed above.

U.S. Pat. No. 139,922, issued to Savery, discloses a filter employing a mass of charcoal or equivalent filtering substance, B, supported on sloping bottom walls, d.

U.S. Pat. No. 1,455,505, issued to Paterson, discloses a filter in which a main header, a, is exposed within a trough, or recess in a bottom wall. Manifold pipes or heads, e, are connected to the main header. Note that the main header and manifold pipes are all exposed and are not embedded or supported in any floor structure.

U.S. Pat. No. 1,698,079, issued to Wagner, discloses a sloping bottom wall forming a part of the lower underdrain system. Note that this bottom wall does not support any of the granular filtering material, and does not cooperate in any way with the particle removing operation.

U.S. Pat. No. 1,997,114, issued to Martin, discloses a fluid distributing header 13 having sloping bottom walls. This header receives the inlet flow of water, and thereafter distributes it through perforated pipes 15 into the granular filter material. Martin does not relate to any underdrain, or filter bottom arrangement for receiving filtered fluids. Moreover, Martin is not at all concerned with designing a bottom construction that facilitates the removal of granular filtering material.

DESCRIPTION OF THE INVENTION

A bottom for a filter of the type employing granular material for removing impurities from liquids, characterized in that said bottom includes:

a fill material having an upper surface adapted to support the granular material, said fill material including an elongate trough defined, in part, by elongate sidewall sections having a steeper slope than adjacent lateral wall sections of the upper surface, said adjacent wall sections sloping in an upward direction away from the trough and toward sidewalls of the filter;

an egress passage means interrupting an elongate bottom wall section of the trough for receiving the granular material therethrough when it is desired to remove granular material from the filter;

an elongate header, having a central passageway therethrough, embedded in an elongate sidewall section defining a part of the trough, a plurality of openings extending through an outer wall of said header and spaced-apart along the elongate extent thereof for communicating the central passageway in the header with filtered liquid;

a plurality of elongate conduits connected to, and extending laterally from the elongate header, said conduits including central passageways communicating with the central passageway of the elongate header, said conduits being embedded in the sloping lateral wall sections of the fill material adjacent the trough, a plurality of openings provided through outer walls of the conduits and spaced-apart along the elongate extent thereof for communicating the central passageways in said conduits with filtered liquid; and liquid-pervious screen means associated with the openings through the header and lateral conduits for impeding the flow of granular material while permitting filtered liquid to pass therethrough.

In the most preferred embodiment of this invention an elongate header, of the type described above, is embedded in each of the elongate sidewall sections of the elongate trough. Moreover, each of the elongate headers is associated with lateral conduits and liquid-pervious screen means as described above.

Reference throughout this application to the header(s) and lateral conduits being "embedded" in fill material or filter bottom is not limited to an arrangement in which these elements are completely encased in the fill material, but rather, is intended to include arrangements wherein the header(s) and conduits are sufficiently encased within the fill material forming the filter bottom to be supported and protected thereby. Most preferably the lateral conduits will be embedded at least 50%, and most preferably more than 90% of their height (i.e. diameter). Also, most preferably the header(s) will be embedded within the fill material more than 50% of their height (i.e. diameter).

The above arrangement of embedding the headers and lateral conduits permits them to be formed of lightweight noncorrosive plastic materials, such as polyvinyl chloride, without becoming damaged, either by an individual entering the filter chamber, or by the movement of granular material over them; particularly during removal of the particulate material from the filter for replacement and/or regeneration. Moreover, since the headers and conduits are actually sealed by the fill material, as a result of being embedded therein, there are virtually no "dead spaces" around these elements in which liquids can stagnate and become contaminated. In addition, the inclusion of openings in the outer walls of the headers further assists in the elimination of dead spaces at the base of the trough; providing a further advantage in eliminating areas in which liquids would otherwise stagnate.

In accordance with this invention several well known techniques can be employed to assist in the removal of granular material from the filter. One well known technique is to actually pressurize the filter from above the filter bed, and thereby force the particles through the egress passage means. An alternative arrangement is to direct water in a reverse direction through the openings in the laterals and headers to actually wash the granular particulate material out the egress passage means. This latter technique can be employed at the same time that the filter is maintained under pressure, or alternatively, at the same time that a vacuum is established through the egress passage means.

All of the above techniques for removing particulate material have been employed in the past; however, with varying degrees of success. In this invention, the arrangement of the sloping bottom wall sections adjacent the central trough, in conjunction with the provision of the egress passage means at the base of the trough, greatly facilitates the removal of granular material, and will greatly minimize, and in most cases eliminate the necessity of sending an operator into the filter to shovel out particulate material as part of the removal operation. This beneficial result is achieved in the instant invention in conjunction with protecting the headers and conduits of the underdrain system and eliminating "dead spaces" in which contaminates could grow.

In the most preferred embodiment of this invention bottom wall sections of the trough slope downwardly toward the egress passage means. This arrangement permits the granular particulate material flowing into the trough to move, by gravity, toward and into the egress passage means.

In the most preferred embodiment of this invention the elongate headers embedded in each of the elongate sidewall sections of the trough are interconnected by a common manifold, which, in turn, communicates with an outlet for filtered liquid. This provides an extremely simple and reliable means for removing liquid from the filter system.

In the most preferred embodiment of this invention, wherein the bottom wall sections of the trough slope downwardly toward the egress opening, the openings provided in the outer wall of the elongate headers likewise are arranged along a sloping line, corresponding to the general direction of slope of said bottom wall sections. Arranging the openings in this manner further reduces the possibility of creating dead spaces at the base of the trough.

In the most preferred embodiment of this invention the elongate trough is substantially U-shaped in transverse cross-section, and is located centrally within the bottom wall. Lateral wall sections therefore slope upwardly away from the trough in a direction toward the sidewalls of the filter.

Other objects and advantages of this invention will become apparent by referring to the Description of the Preferred Embodiments of the Invention which follows, taken in conjunction with the accompanying drawings.

DESCRIPTION OF THE PREFERRED EMBODIMENTS OF THE INVENTION

Figure 2:
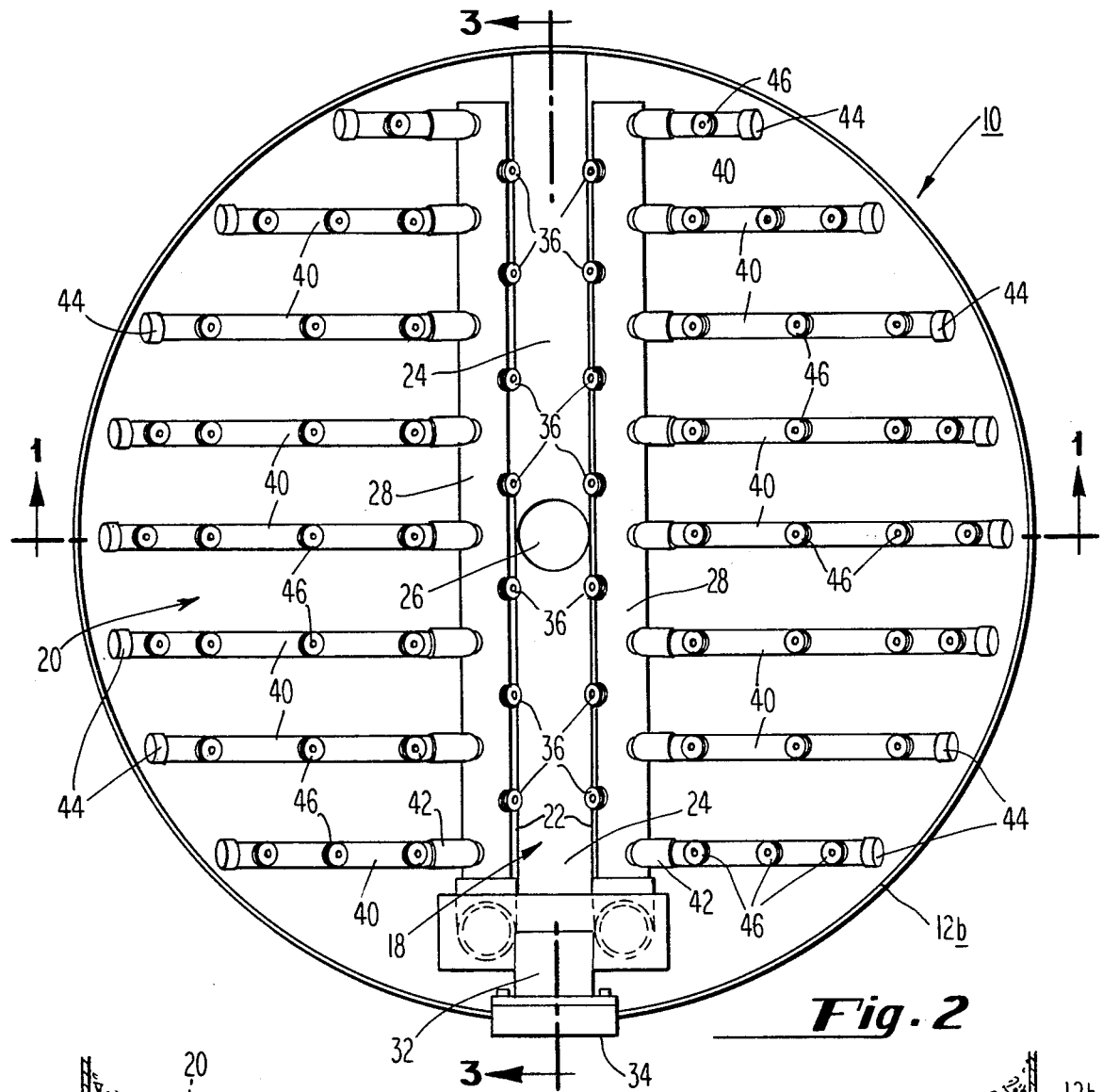
FIG. 2 is a plan view of the underdrain system with part of the fill material forming the bottom removed to show details of construction.
Figure 1:
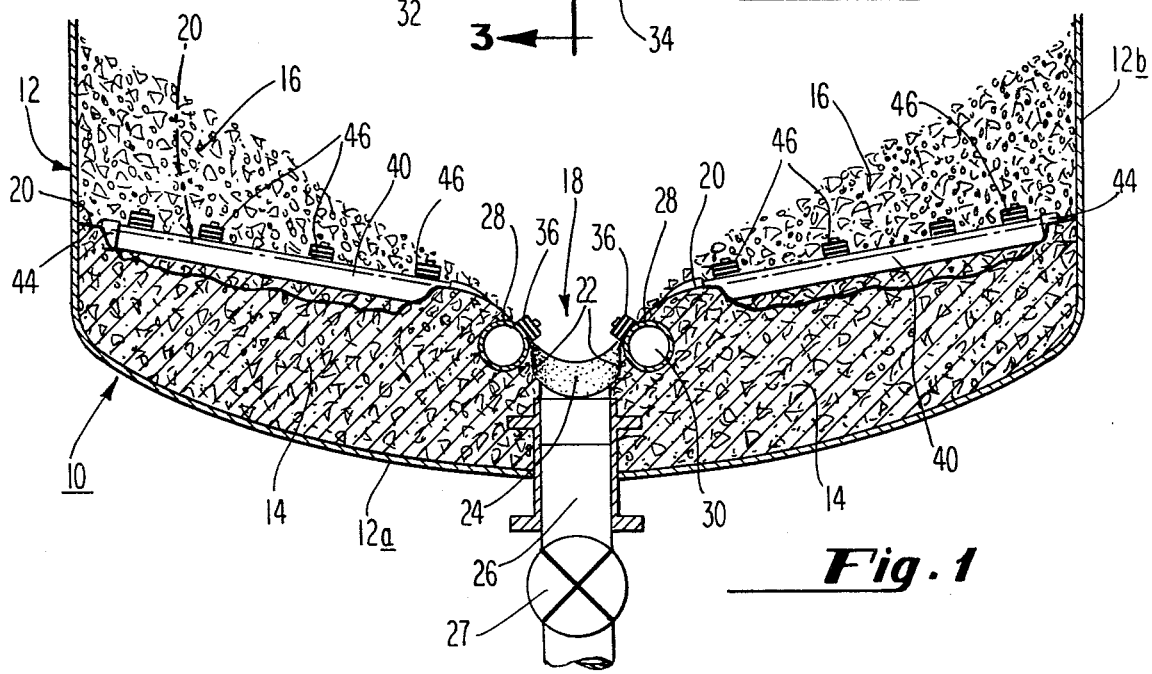
FIG. 1 is a fragmentary sectional view of a filter, taken along line 1—1 of FIG. 2, and showing the unique arrangement of elements forming the filter bottom in accordance with this invention.
Figure 3:
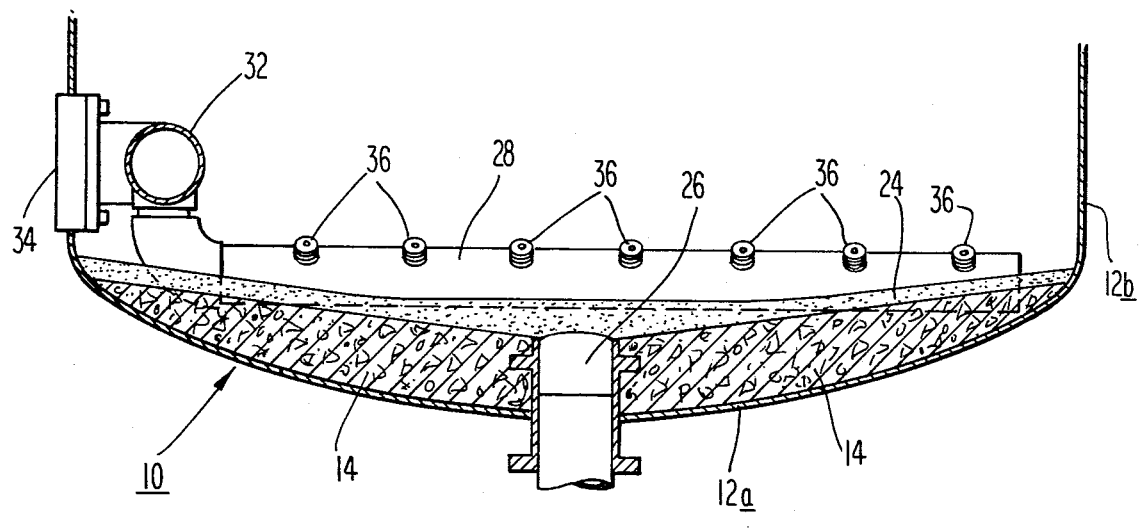
FIG. 3 is a sectional view taken along line 3—3 of FIG. 2 including the fill material forming the bottom.

Referring to FIGS. 1-3, this invention will be described in connection with a pressure filter system of the type employing granular activated carbon as the filtering media. However, it should be understood that the present invention can be employed with other filter systems, such as gravity systems, and also in conjunction with other types of media besides granular activated carbon. However, this invention has its greatest benefits when employed in connection with granular material that needs to be removed at fairly frequent intervals, either for replacement or regeneration. It is in this type of environment that the greatest likelihood of damage to the filter bottom exists.

Referring to FIGS. 1–3, the pressure filter 10 of this invention includes an outer shell 12 having a bottom wall 12a and sidewall 12b. A fill material 14, preferably in the form of concrete, is poured to form the bottom of the filter chamber. It is on the upper surface of this fill material that the granular activated carbon 16 is supported.

It should be pointed out that the fill material 14 is poured after proper location of the headers and lateral conduits forming the underdrain system. The arrangement of this underdrain system will be described later in the application.

Referring specifically to FIG. 1, the bottom 14 includes a central elongate trough 18 joined to adjacent lateral wall sections 20. The central trough is generally U-shaped, and includes elongate sidewall sections 22 and an elongate bottom wall section 24. The bottom wall section 24 is interrupted by an egress passage means 26 through which the granular material 16 is adapted to pass when it is being removed from the filter 10. More preferably the bottom wall section 24 slopes in a direction downwardly from the ends adjacent the sidewall 12b to the egress passage means 26, as can be seen best in FIG. 3.

The conduit system of this invention includes a pair of elongate headers 28 having a central passageway 30 therein. These headers are embedded in the sidewall section 22 of the trough, and are connected through a common manifold 32 to an outlet 34 for filtered liquid.

A plurality of openings (not shown) are spaced-apart along the elongate extent of each header 28 and extend through the outer walls thereof. Each of these openings communicate with the central passageway 30, and are covered by conventional strainers 36 mounted within the openings. Each strainer generally includes a central strainer screen, secured between a strainer base and strainer upper cap to permit the filtered liquid to pass into the central passageway 30 of the headers 28, while preventing the passage of granular material therethrough. The construction of strainers 36 are well known in the prior art, and no further explanation is believed to be necessary herein. In fact, the specific strainer mechanism or means employed in applicant's filter system is not considered to be limiting on this invention. Any screening system which permits liquid to pass into the headers, while preventing the flow of particulate material therethrough, can be employed; provided it does not become undesirably contaminated by the liquids being filtered.

The openings through the headers, and the strainers 36 connected thereto, are oriented in a direction toward the central elongate axis of the trough, and therefore are arranged to receive filtered liquids which tend to flow into the trough. This orientation of the openings in the headers 28 provides the desirable function of preventing, or minimizing dead areas in the trough wherein liquids could stagnate and become contaminated.

Referring specifically to FIGS. 1 and 2, the underdrain system further includes a plurality of elongate conduits 40 extending laterally from each of the elongate headers 28, and connected to their respective headers by a suitable coupling 42. The conduits 40 are spaced-apart along the elongate extent of their respective headers, and the free ends thereof are suitably capped at 44. A plurality of openings (not shown) are provided through the outer walls of each of the conduits 40, and these openings are spaced along the elongate extent of said conduits. A strainer 46 is suitably secured within each of the openings in the lateral conduits 40, and these strainers can be of the same conventional type discussed above in connection with strainers 36. Again, it should be noted that the particular strainer utilized does not constitute a limitation on the present invention, and any suitable strainer mechanism can be employed which will permit the liquid to pass into a central passageway within the conduits 40, while at the same time preventing the flow of the particulate material 16 into said conduits.

Referring to FIG. 1, it should be noted that the lateral conduits 40 slope in an upward direction away from the central trough 18 and toward sidewall 12b of the outer shell 12. These lateral conduits 40 are embedded in the lateral wall sections 20; more preferably to 90% or more of their height, and the lateral wall sections 20 also slope upwardly away from the central trough 18.

By embedding the headers 28 and the lateral conduits 40 in the filter bottom formed by the fill material several advantages are achieved. First, the fill material actually acts as a support for the headers and laterals. Therefore, there is no need to provide a supporting superstructure for the conduits, in the manner required in the earlier-referenced Stevens U.S Pat. No. 4,161,963. Secondly, the fill material 14 protects the headers 28 and laterals 40 against damage which could otherwise occur due to the mass transfer of particulate material over these elements as the granular material 16 is being removed. Thirdly, by encasing the headers and laterals in the fill material dead spaces are eliminated in which liquid could stagnate, and become contaminated.

Figure 4:
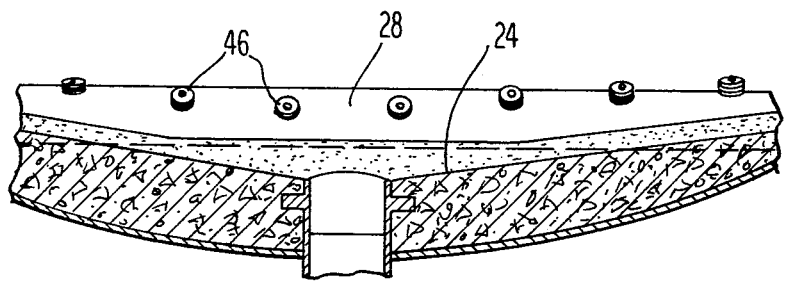
FIG. 4 is a sectional view similar to FIG. 3, but showing an alternate embodiment of the invention.

Referring specifically to FIG. 4, an alternative arrangement is indicated, wherein the spaced-apart openings in the headers 28 (only one being illustrated) are located along a sloping line, generally corresponding to the direction of slope of the elongate bottom wall section 24 of the central trough 18. This maintains the openings into the headers relatively close to the base of the trough to thereby further minimize the possibility of dead spaces existing in which liquid could stagnate.

Although the present invention has been described with reference to the particular embodiment herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What I claim as my invention is the following:

1. A bottom for a filter of the type that includes granular material for removing impurities from liquids, characterized in that said bottom includes:

a fill material having an upper surface adapted to support said granular material, said upper surface including an elongate trough defined, in part, by elongate sidewall sections having a steeper slope than adjacent lateral wall sections of said upper surface, said lateral wall sections sloping in an upward direction from the trough toward sidewalls of the filter;

egress passage means interrupting an elongate bottom wall section of the trough, said egress passage means being adapted for use in removing granular material from the filter;

an elongate header embedded in a sidewall section defining a part of the elongate trough, said header including a central passageway and a plurality of openings extending through an outer wall thereof for communicating with said central passageway, said openings being spaced along the elongate extent of the header for receiving filtered liquid, said header communicating with an outlet for said filtered liquid;

a plurality of conduits extending laterally from the header at spaced locations along the elongate extent of said header, said conduits having central passageways communicating with the central passageway through the header, said conduits having a plurality of openings through outer walls thereof for receiving filtered liquid, said openings extending along the elongate extent of said conduits and communicating with the central passageways therethrough, said conduits sloping upwardly from the header toward sidewalls of the filter and being embedded in the sloping lateral wall sections of the bottom; and liquid-pervious screen means associated with the openings that extend through the outer walls of the header and lateral conduits for permitting filtered liquid to pass into said header and conduits while impeding the flow of granular material.

2. The filter bottom of claim 1, characterized in that the elongate trough is defined, in part, by a pair of spaced-apart elongate sidewall sections, characterized in that an elongate header is embedded in each of said sidewall sections, each of said headers having an elongate passageway therethrough and a plurality of openings disposed through an outer wall thereof, said openings communicating with the central passageway through the headers and being spaced along the elongate extent of said headers for receiving filtered liquid, each of said headers communicating with an outlet for filtered liquid;

a plurality of conduits extending laterally from each of the headers, said conduits including central passageways communicating with the central passageways of their respective headers at spaced-apart locations along the elongate extent of said headers, each of said conduits including openings through an outer wall thereof for communicating with the central passageways through said conduits, said openings being spaced along the elongate extent of said conduits and adapted to receive filtered liquid, said conduits being embedded in the sloping lateral wall sections of the bottom; and liquid-pervious screen means associated with the openings that extend through the outer walls of the headers and lateral conduits for permitting filtered liquid to pass into said headers and conduits while impeding the flow of granular material.

3. The filter bottom of claim 2, wherein each of said headers communicates with the same outlet through a common manifold.

4. The filter bottom of claims 1, 2 or 3, characterized in that the elongate bottom wall section of the trough slopes upwardly in a direction away from the egress passage means for the granular material.

5. The filter bottom of claim 4, characterized in that the plurality of openings through the outer wall of a header are located along a line that slopes in the same direction as an adjacent elongate bottom wall section of the trough.

6. The filter bottom of claim 5, characterized in that the plurality of openings through each of the headers are spaced along lines that slope in the same direction as adjacent elongate bottom wall sections of the trough.

7. The filter bottom of claim 4, characterized in that the egress passage means is a conduit located substantially centrally between opposed elongate ends of said trough, and said bottom wall section of the trough slopes upwardly in opposite directions from the egress passage means toward sidewalls of the filter.

8. The filter bottom of claim 1, characterized in that the elongate trough is disposed centrally therein.

9. The filter bottom of claim 8, characterized in that the trough is generally U-shaped in cross-section.

10. A bottom for a filter of the type that employs granular material for removing impurities from liquids, characterized in that said bottom includes:

an elongate trough including a bottom wall section and sloping sidewall sections, said bottom wall section being interrupted by an egress passage means for the granular material;

lateral wall sections adjacent the trough and sloping upwardly away from said trough toward sidewalls of the filter;

an elongate header, having a central passageway therethrough, embedded in an elongate sidewall section of the trough, said header including a plurality of openings disposed along the elongate extent thereof and extending through an outer wall thereof for permitting filtered liquid to pass into the central passageway of said header;

a plurality of conduits extending laterally from the header and including central passageways communicating with the central passageway of the header, said conduits being spaced-apart along the elongate extent of the header and sloping upwardly from the header toward sidewalls of the filter, said conduits being embedded in sloping lateral wall sections of the bottom and including a plurality of openings through the outer walls thereof, said openings being spaced along the elongate extent of the conduits for receiving filtered liquid; and liquid-pervious screen means associated with the openings through the outer walls of the header and lateral conduits for permitting filtered liquids to enter the header and conduits while impeding the flow of the granular material.

* * * * *